United States Patent Office 3,349,267
Patented Oct. 24, 1967

3,349,267
HYDROGEN THYRATRON WITH HIGH HEATED DISSIPATION
Eric Jones, Chelmsford, England, assignor to English Electric Valve Company Limited, London, England, a British company
Filed Nov. 22, 1965, Ser. No. 509,041
Claims priority, application Great Britain, Nov. 24, 1964, 48,296/64
7 Claims. (Cl. 313—33)

ABSTRACT OF THE DISCLOSURE

A hydrogen thyratron is provided which has a metal envelope defining a hydrogen-filled cavity which houses a cathode, a grid and a cylindrical anode. Either the cathode or the grid is connected directly to the envelope which thus acts as a heat sink for the electrode in question. The anode is housed within a cylindrical recess which is included in the cavity and which is slightly larger in diameter than the anode. Communication between the recess and the rest of the cavity is made through a relatively small slot.

---

The invention relates to hydrogen thyratrons.

A problem in conventional hydrogen thyratrons is that if high operating currents are required the electrodes have to be physically large in order that the heat generated may be dissipated. Therefore small physical size and high current dissipation are two mutually conflicting requirements. It is an object of the invention to provide a thyratron which, in a given physical size, will allow the use of relatively high operating currents.

According to the invention a hydrogen thyratron comprises a hydrogen-filled cavity defined by a metal envelope having housed therein a cathode, a grid and an anode, the cathode or grid being connected directly to the envelope. Preferably the anode is cylindrical and the cavity includes a cylindrical recess slightly larger in diameter than the anode and housing the anode, communication between the recess and the rest of the cavity being made through a relatively small slot. Thus the invention provides a heat sink for the grid or cathode in the form of the envelope connected directly thereto, and furthermore in the preferred arrangement dissipation of heat from the anode is greatly enhanced by the proximity of the metal envelope over a large area.

Preferably the grid comprises a metal rod arranged immediately over the slot and aligned therewith. The cathode is conveniently of cylindrical form parallel with the said grid rod and slot and disposed on the side of the rod remote from the slot. Between the grid and the cathode there may be provided a plate integral with the envelope and having an aperture aligned with the cathode and the grid rod. Instead of the apertured plate there may be provided a heat shield constituted by an assembly of baffle plates surrounding the cathode and having an aperture therein positioned between the cathode and the grid.

Preferably said envelope is provided externally with a flange by which it may be bolted or otherwise fixed in good thermal contact with a heat sink.

Figure 1:
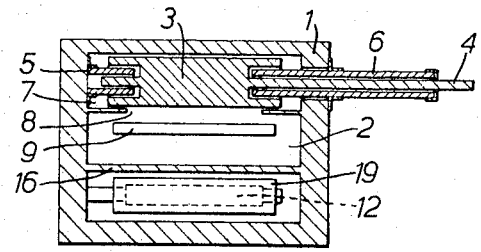
Figure 2:
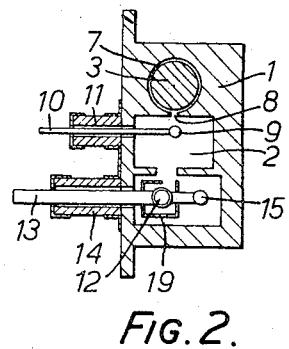
Figure 3:
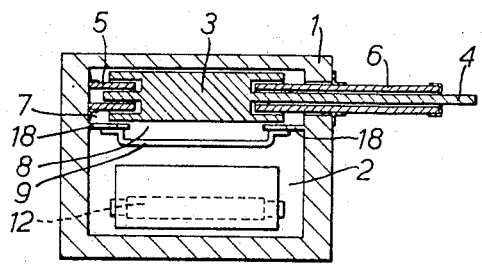
Figure 4:
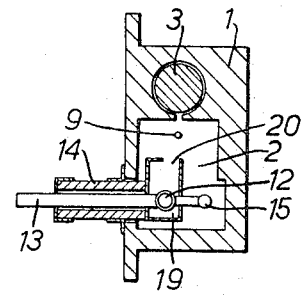

The invention will be further described with reference to the accompanying drawings in which, FIGURE 1 is a sectioned front elevation of a thyratron according to the invention, FIGURE 2 is a sectioned side elevation of the thyratron of FIGURE 1, FIGURE 3 is a sectioned front elevation of another embodiment of the invention, and FIGURE 4 is a sectioned side elevation of the thyratron of FIGURE 3.

Referring to FIGURES 1 and 2, there is shown a thyratron comprising a metal envelope 1 defining a hydrogen-filled cavity 2. The anode comprises a solid metal cylinder 3 having an external rod connection 4 and mounted in the envelope 1 by two cylindrical hollow ceramic insulators 5 and 6. The anode cylinder 3 is housed within a cylindrical chamber 7 which is arranged to be as small in diameter as is practically possible, bearing in mind the limitations that the envelope 1 must be far enough away from anode 3 to withstand the cathode-anode potential drop, since the envelope 1 is maintained at cathode potential, as will be apparent from the following description.

A slot-like aperture 8 affords communication between the chamber 7 and the remainder of the cavity 2, and immediately beneath this aperture there is disposed a cylindrical metal rod 9 which constitutes the grid of the thyratron. The external connection for the grid is taken out by means of a conductor 10 which passes through a hollow cylindrical ceramic insulator 11. Additional insulating support for the grid is provided at the other end thereof.

The cathode of the thyratron is shown at 12, being of cylindrical form and mounted within the cavity 2 beneath the rod 9. The cathode is supported at one end by electrical and mechanical connection with the wall of the envelope 1 and at the other end by a conductor 13 which passes through the wall of the envelope and is supported in a hollow ceramic insulator 14. A heater supply for the cathode is applied between conductor 13 and envelope 1. A heat shield 19 encloses cathode 12 except for a slot-like aperture on the side towards the grid.

In order to make up any deficiencies in the hydrogen atmosphere within the cavity there is provided a hydrogen reservoir 15 which takes the form of a titanium metal strip bent in cylindrical form, arranged, during the manufacture of the tube, to be saturated with absorbed hydrogen. Current is passed through the titanium strip during working of the thyratron in order to heat the strip and maintain the required concentration of gas by evaporation of some of the absorbed hydrogen from the titanium.

For heat shielding purposes there is provided a plate 16 integral with the envelope 1, disposed between cathode and grid and having an aperture therein to allow the discharge.

FIGURES 3 and 4 show another embodiment of the invention in which the envelope structure 1 is maintained not at cathode potential but at grid potential. The basic lay-out of the thyratron of FIGURES 3 and 4 is the same as that of 1 and 2 with respect to the anode and general arrangement of the grid and cathode, but it will be seen that the grid rod 9 is connected directly to the envelope 1 by means of welding to the flange 18 which defines the slot aperture 8. No external connection is made for the grid in this embodiment. In operation the whole body of the thyratron is held at the required grid potential, and means are provided for varying this potential in accordance with required potentials on the grid.

In this embodiment the cathode connectors, of which one is shown at 13, are both taken out through the envelope 1 and are both insulated therefrom by means of ceramic insulators, such as 14. Instead of the interal apertured plate 16 of FIGURE 1 there is provided a heat shield consisting of an assembly 19 of baffle plates mounted to surround the cathode 12. There is an aperture 20 in the heat shield between the cathode and the grid.

I claim:

1. A hydrogen thyratron having a hydrogen-filled cavity defined by a metal envelope having housed therein a cathode electrode, a grid electrode and a cylindrical anode electrode, one of said cathode and grid electrodes being connected directly to said envelope and said cavity including a cylindrical recess slightly larger in diameter than the anode and housing the anode, communication between the recess and the rest of the cavity being made through a relatively small slot.

2. A hydrogen thyratron according to claim 1 wherein said cylindrical recess comprises a cylindrical wall in close heat-dissipating proximity to said anode and said relatively small slot being formed in said cylindrical wall intermediate said anode and said cathode.

3. A hydrogen thyratron as claimed in claim 1 wherein the grid comprises a metal rod arranged immediately over the slot and aligned therewith.

4. A hydrogen thyratron as claimed in claim 3 wherein the cathode is of cylindrical form parallel with the said grid rod and slot and disposed on the side of the rod remote from the slot.

5. A hydrogen thyratron as claimed in claim 3 wherein there is provided between the grid and the cathode a plate integral with the envelope and having an aperture aligned with the cathode and the grid rod.

6. A hydrogen thyratron as claimed in claim 3 wherein a heat shield constituted by an assembly of baffle plates surrounding the cathode and having an aperture therein is positioned between the cathode and the grid.

7. A hydrogen thyratron as claimed in claim 1 wherein the envelope has an external flange adapted to be fixed in good thermal contact with a heat sink.

References Cited

UNITED STATES PATENTS 3,130,344    4/1964    Baker et al. _____ 313—204 X

JAMES W. LAWRENCE, *Primary Examiner.*

C. R. CAMPBELL, *Assistant Examiner.*